United States Patent [19]
Joseph

[11] Patent Number: 5,385,330
[45] Date of Patent: Jan. 31, 1995

[54] COMPRESSION SILL COCK FLANGE

[76] Inventor: Mickey W. Joseph, 268 Devon St., Port Orange, Fla. 32127

[21] Appl. No.: 185,128

[22] Filed: Jan. 24, 1994

[51] Int. Cl.⁶ .............................................. F16L 5/00
[52] U.S. Cl. ................................... 251/148; 137/360; 285/64; 285/90; 285/341
[58] Field of Search ............... 137/357, 801, 359, 360, 137/358; 251/148; 285/64, 341, 90, 353

[56] References Cited

U.S. PATENT DOCUMENTS

| | | |
|---|---|---|
| 213,667 | 3/1879 | Kronenberg et al. ............ 285/90 X |
| 1,080,520 | 12/1913 | Schuermann . |
| 2,210,986 | 8/1940 | Martin ................................ 251/156 |
| 2,652,224 | 9/1953 | Noland . |
| 3,107,107 | 10/1963 | Guarnaschelli .................... 285/90 X |
| 3,971,401 | 7/1976 | Persson ............................... 137/360 |
| 4,182,356 | 1/1980 | Woodford, Sr. ...................... 137/59 |
| 4,316,481 | 2/1982 | Fillman ............................... 137/302 |
| 4,593,940 | 6/1986 | Wilder ............................. 285/341 X |
| 4,836,237 | 6/1989 | McCullough ....................... 137/312 |
| 4,944,534 | 7/1990 | Kotyk ............................. 285/341 X |
| 5,129,416 | 7/1992 | Ackroyd .............................. 137/218 |

FOREIGN PATENT DOCUMENTS

| | | |
|---|---|---|
| 013179 | 7/1956 | Germany ........................... 285/341 |
| 1216207 | 5/1966 | Germany . |
| 563581 | 8/1944 | United Kingdom ................. 285/90 |
| 940462 | 10/1963 | United Kingdom . |

Primary Examiner—Martin P. Schwadron
Assistant Examiner—Kevin L. Lee
Attorney, Agent, or Firm—Edward M. Livingston

[57] ABSTRACT

A compression sill-cock flange has a pipe coupling (1) with a flange (8) extended radially outward from a seal end (5). The pipe coupling (1) is straight-threaded internally from an attachment end (3) to a tapered sealing wall (4). The tapered sealing wall (4) is extended inward conically at a select angle from an inside circumferential periphery of the straight threading (2) to a circumferential coupling base (6) that is positioned in sliding contact with an outside periphery of a pipe (12) to which the pipe coupling (1) is attachable. The circumferential coupling base (6) extends to a desired position relative to the seal end of the pipe coupling (5). A set-screw orifice (9) with appropriate threading in a set-screw boss (10) can be provided on the pipe coupling (1). Use means are provided for use in relation to a double-tapered washer (14) and a sill cock (17).

21 Claims, 3 Drawing Sheets

COMPRESSION SILL COCK FLANGE

BACKGROUND OF THE INVENTION

This invention relates to attachments of sill cocks to buildings and in particular to a flanged pipe connector positioned on pipes extended outside of buildings under construction for attachment of outside faucets after construction of building is completed.

Typically during construction of houses and other buildings, water pipes to be used outside of the houses or buildings are extended through walls, which usually are near ground level, for attachment of faucets after construction is completed. In present practice, a steel cock or a copper stub is used to attach faucets to outlet pipes during construction. After construction when all outside layers of construction materials have been added and finishing work has been completed, the steel cocks are removed and extensions positioned with soldering methods. This is time-consuming, expensive and fire-hazardous.

A wide variety of connection means for various types of faucets exist in the prior art, but none is designed for ease of use and application during and after construction of buildings in the manner taught by this invention.

For purposes of this invention, terms are defined as follows. A sill cock is a complete faucet of a type used on water pipes extending from inside to outside of buildings at positions usually near sills or bottom sections of buildings. Faucets are referred to frequently as cocks. Hence the term sill cock is used to indicate an outside faucet generally. A spigot is a portion of a faucet or sill cock with which flow through the faucet or sill cock is prevented selectively for regulated control. Tapered threads are self-sealing and known also as pipe threads. Straight threads are referred to frequently in the plumbing trade as pressure threads because sealing requires linear pressure to be applied with uniform-diameter threading against some form of washer or sealing component. A washer tapered on both ends for pressure sealing inward circumferentially with linear pressure of reciprocally tapered circumferential walls is known variously as a nipple washer, a double-tapered washer, pressure washer or a compression ring or compression ferrule.

One example of a different means for connecting known sill cocks to water pipes extending from inside to outside of a building is described in U.S. Pat. No. 1,080,520 granted to Schuermann. Different from this invention, it employed tapered threading adjacent to straight threading linearly on a pipe-connection end of a sill cock. A pipe from inside of a building was threaded to the tapered threads of a sill cock and a collar nut was threaded to the adjacent straight threads on the sill cock. The collar nut was tightened against an outside wall of the building in opposition to an inside connection of the pipe. A coupling flange on a short sleeve with a sealing inside periphery positioned on the outside periphery of a connection end of the sill cock was then slid over the collar nut to a position of contact with the outside wall of the building.

The Schuermann patent is cited as more nearly similar to this invention than any other known device. However, its use of two threading types adjacent linearly, its nonuse of a nipple washer and its cupped form and use of a flange are different. Thus, it is different from this invention in both structure and working relationship of parts.

Other patents found in the prior art are not deemed to be sufficiently similar to the invention. For instance, German Patent No. 1,216,207, dated May 5, 1966, teaches an adjustable exterior faucet system, but also does not use a nipple washer. Other prior patented art relating to sill cock flanges, but bearing no similarity to the present invention, includes Great Britain Patent No. 940,462, and U.S. Pat. Nos. 3,971,401; 2,210,986; 2,652,224; 4,836,237; 4,316,481; 5,129,416 and 4,182,356.

The use of compression fittings in sill cocks is prior art, but the inclusion of a flange with a nut in a sill cock fitting as provided by this invention for convenience, safety and low cost is novel and non-obvious.

SUMMARY OF THE INVENTION

In light of the problems that have existed and that continue to exist in the common present practice of cutting pipe extending from sides of buildings after completion and welding on sill cocks, objectives of this invention are to provide a compression sill-cock flange which:

Allows extension of a pipe from within a building under construction to a position sufficiently far outside of the building to avoid interference or contact with outside wall materials and finishing activities and yet be conveniently cut off and attached to a sill cock after construction of the building;

Protects a proximate sill-cock-connecting portion of the extended pipe from paint, cement and other coating materials;

Avoids costs of soldering and soldering labor;

Avoids fire hazards of soldering; and

Provides convenient joining of a sill cock to the extended pipe with low-cost labor.

This invention accomplishes the above and other objectives with a compression sill-cock flange extended radially outward from a seal end of a pipe coupling. The pipe coupling is straight-threaded internally from an attachment end to a tapered sealing wall. The tapered sealing wall is extended inward conically at a select angle from an inside circumferential periphery of the straight threading to a circumferential coupling base that is positioned in sliding contact with an outside periphery of a pipe to which the pipe coupling is attachable. The circumferential coupling base extends to a desired position relative to the seal end of the pipe coupling. A set-screw orifice with appropriate threading in a set-screw boss can be provided on the pipe coupling. Use means are provided.

BRIEF DESCRIPTION OF THE DRAWINGS

This invention is described by appended claims in relation to description of a preferred embodiment with reference to the following drawings which are described briefly as follows:

DESCRIPTION OF PREFERRED EMBODIMENTS

Figures 1, 2:
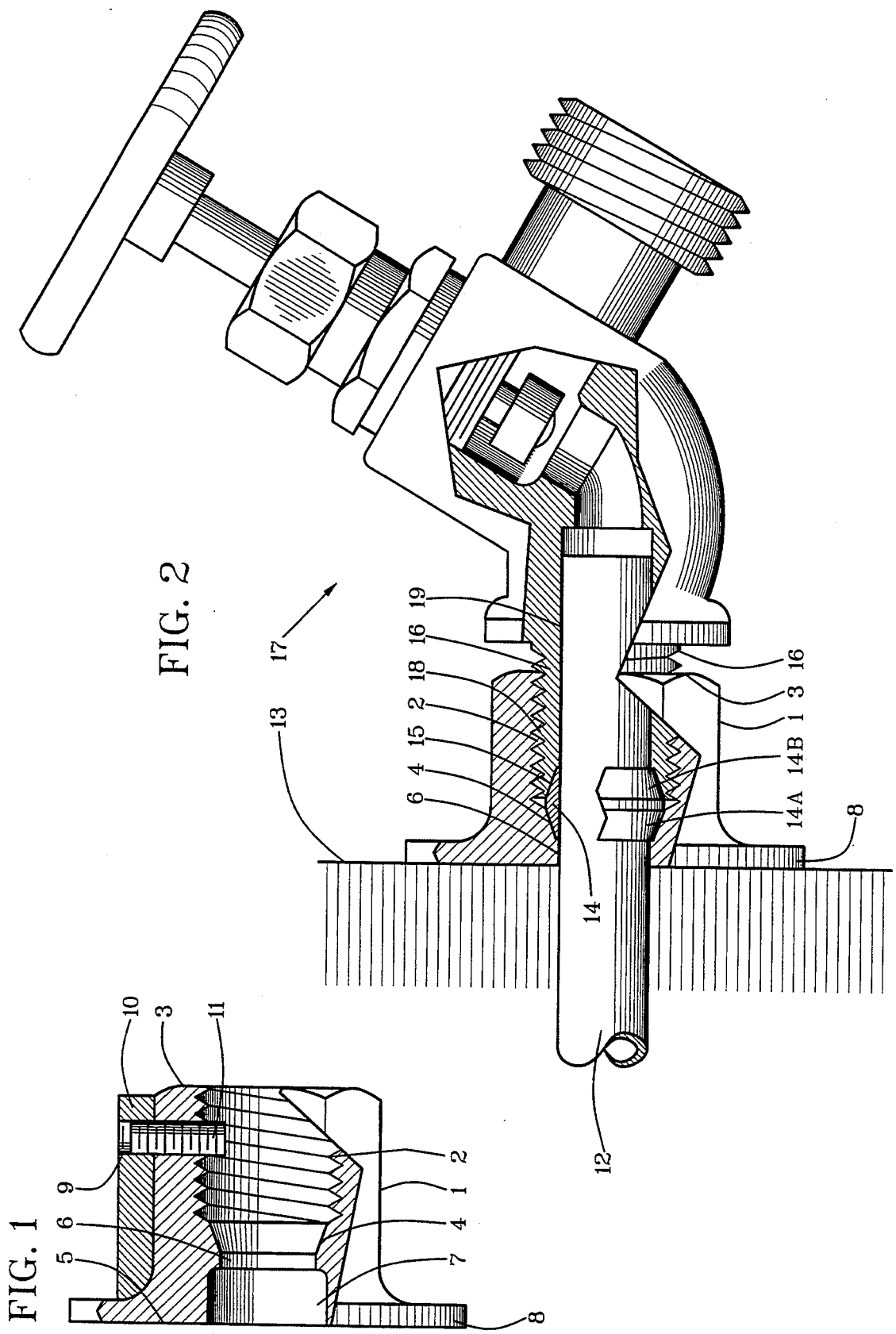
FIG. 1 is a cutaway side view.
FIG. 2 is a cutaway side view in relation to a building wall and a sill cock.

Reference is made first to FIG. 1. A pipe coupling 1 has straight internal machine threads 2 with a constant inside diameter extended from proximate an attachment end 3 to proximate a circumferential sealing wall 4 on a circumferential inside periphery of the pipe coupling 1. The circumferential sealing wall 4 is extended inward circumferentially and tapered conically in a direction towards a seal end 5 of the pipe coupling 1. A circumferential coupling base 6 of the circumferential sealing wall 4 has an inside periphery sized for sliding contact with designed tightness on a circumferential outside periphery of a pipe to which the pipe coupling 1 is attachable. The circumferential coupling base 6 is extended to a design position in relation to the seal end 5 of the pipe coupling 1. A fitting funnel 7, if desired between the seal end 5 of the pipe coupling 1 and the circumferential coupling base 6, can have inwardly sloped or curved walls. A flange 8 is extended outward radially from a design position in relation to the seal end 5 of the pipe coupling 1. Preferably the flange 8 is extended outward radially from the seal end 5 of the pipe coupling 1 but can be offset towards the attachment end 3 for some use conditions. An internally threaded set-screw orifice 9 can be extended from an outside periphery of the pipe coupling 1 to an inside periphery of the straight internal machine threads 2. A set-screw boss 10 can be added if walls of the pipe coupling 1 are too thin to support a set screw 11 and threading in the set-screw orifice 9.

Referring to FIG. 2, a pipe 12 to which the pipe coupling 1 is attachable is extended from a building wall 13 into the pipe coupling 1 where a double-tapered washer 14 is positioned intermediate the circumferential sealing wall 4 and a sill-cock seal wall 15 on an end of a sill-cock attachment pipe 16 that is extended from a sill cock 17. Sill-cock-attachment threads 18 are screwed into the straight internal machine threads 2 of the pipe coupling 1 to apply linear pressure to both ends of the double-tapered washer 14 between the circumferential sealing wall 4 and the sill-cock seal wall 15 after the pipe 12 has been inserted into an attachment lumen 19 a desired distance in the sill cock 17. The linear pressure from conical ends of the circumferential sealing wall 4 and the sill-cock seal wall 15 on a first end 14A and on a second end 14B of the double-tapered washer 14 respectively is converted to inward pressure in a sealing connection of the sill cock 17 to the pipe 12.

This particular embodiment does not have a fitting funnel 7 and does not show a set screw 11 which are described in relation to FIG. 1.

Figure 3:
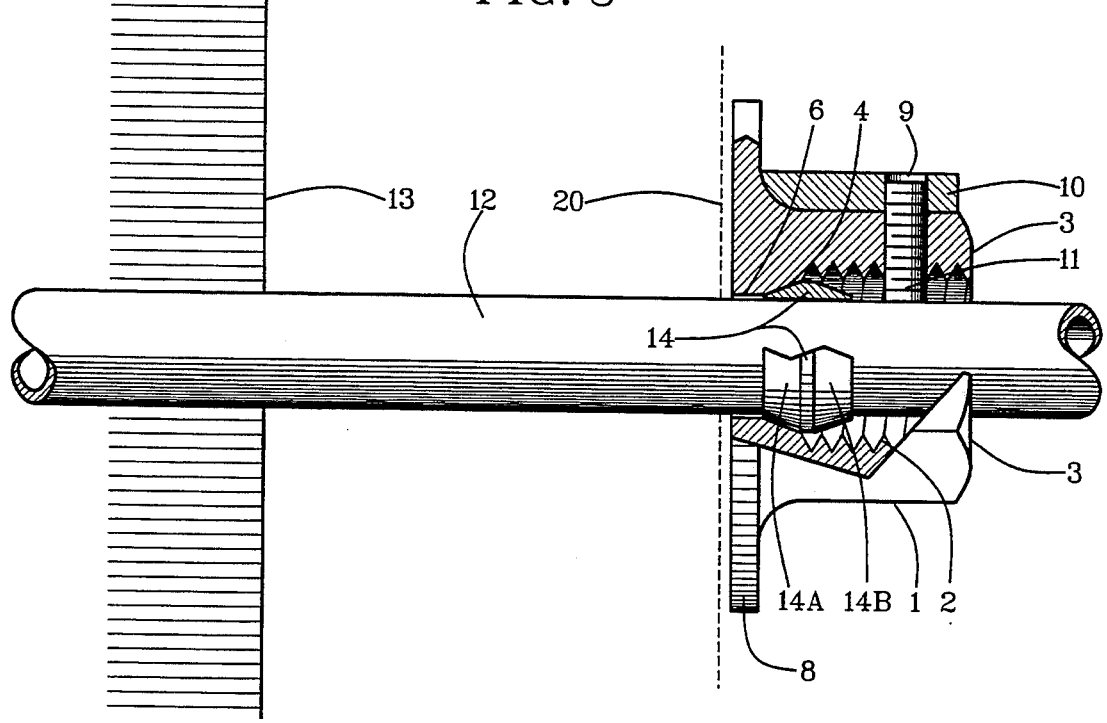
FIG. 3 is a cutaway side view in relation to a building wall of a building under construction.

Referring to FIG. 3, the pipe coupling 1 is positioned on a pipe 12 at a desired distance from a building wall 13 relative to a set line 20 to allow for application of siding, bricks, stucco, paint and/or other finishing materials. Positioning the pipe coupling 1 on the pipe 12 during construction of a building protects a sealing surface on the pipe from paint and other materials and also from accidental marring or scratching that could affect sealing adversely. Positioning the double-tapered washer 14 on the pipe 12 during construction is preferred but optional. The set screw 11 maintains the pipe coupling 1 in position optionally during construction and after construction.

Figure 4:
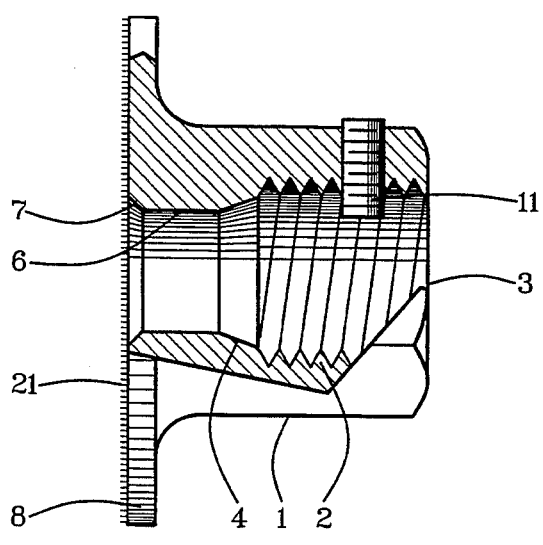
FIG. 4 is a cutaway side view of an embodiment having a relatively long circumferential attachment base and attachment surfacing on a seal side of a flange.

FIG. 4 shows a pipe coupling 1 having a set screw 11 without a set-screw boss 10 that is described in relation to FIG. 1. Design length of the circumferential coupling base 6 can be sufficient to maintain axes of the pipe coupling 1 and the pipe 12, shown in FIGS. 2–3, in desired concentricity during construction and still provide a fitting funnel 7. Surfacing material, surfacing structure or other surfacing 21 can be provided as desired for use with particular types of building surfaces.

Figure 5:
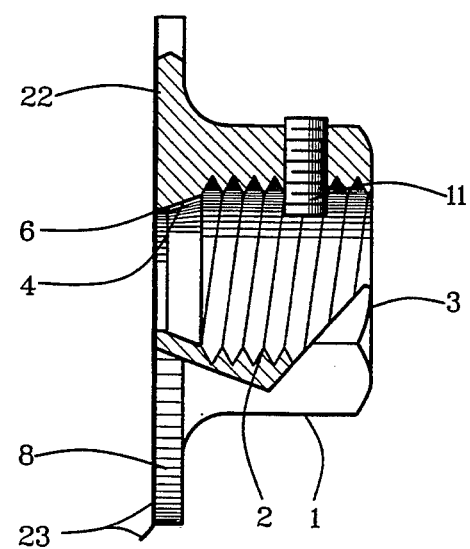
FIG. 5 is a cutaway side view of an embodiment having a relatively short circumferential attachment base and an adhesive covering on a seal side of the flange.

In FIG. 5, a relatively short pipe coupling 1 is provided with a short circumferential coupling base 6 and no fitting funnel 7, shown in FIGS. 1 and 4, for particular use conditions. Adhesive can be positioned on a seal side 22 of the flange 8 and covered optionally with a detachable covering 23 that can be a peel-away type. The seal side 22 is perpendicular to the axis of the pipe coupling 1 for most use conditions but need not be for particular use conditions.

Figure 6:
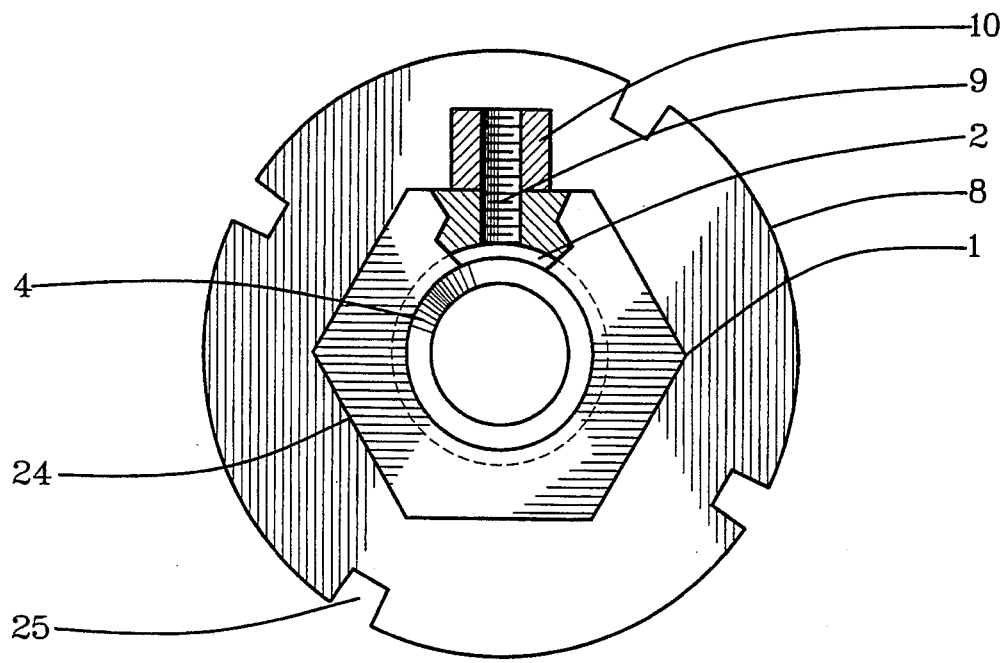
FIG. 6 is a partial cutaway front view of an embodiment having a set-screw boss, wrench flats and attachment notches.
Figure 7:
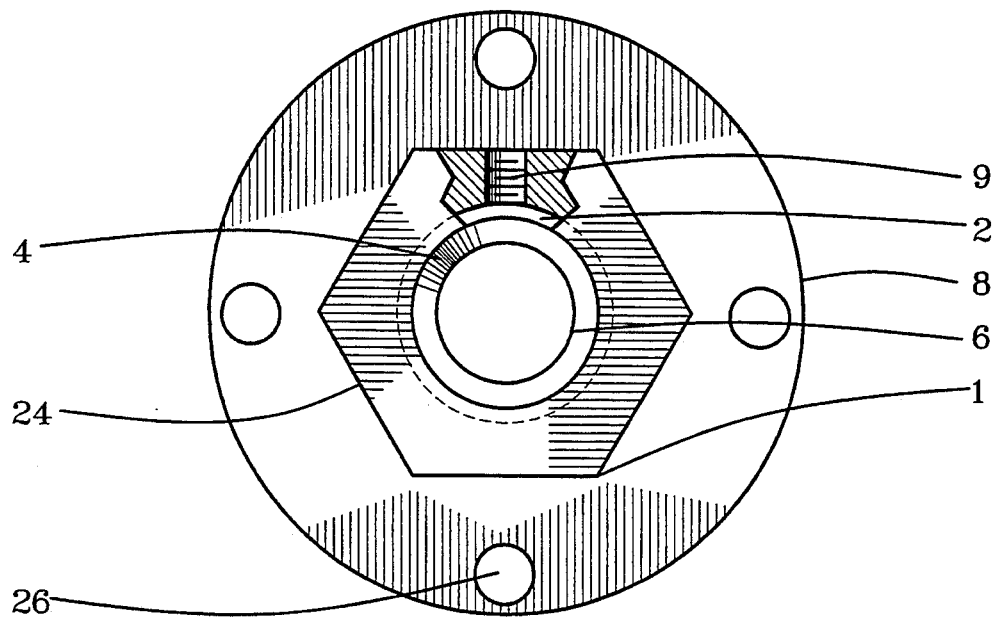
FIG. 7 is a partial cutaway front view of an embodiment without a set-screw boss, with wrench flats and having attachment orifices instead of attachment notches.

In FIGS. 6 and 7, wrench flats 24 are shown from a front view. The wrench flats 24 are desirable for most applications but need not be provided when using pipe wrenches. Location notches 25 are shown in FIG. 6 and location orifices 26 are shown in FIG. 7 for different applications and use conditions as desired.

Various modifications of this invention may be made without departing from its scope of invention. It is intended, therefore, that it be limited only by existence of anticipatory prior art and by descriptions in the following claims.

Having thus described the preferred embodiments of my invention, I claim:

1. A compression sill-cock flange comprising:
   a pipe coupling having straight internal machine threads with a constant inside diameter extended from proximate an attachment end of the pipe coupling to proximate a circumferential sealing wall on a circumferential inside periphery of the pipe coupling;
   the circumferential sealing wall being extended inward circumferentially and tapered conically in a direction towards a seal end of the pipe coupling from a major diameter of the circumferential sealing wall proximate a seal end of the straight internal machine threads to a minor diameter of the sealing wall proximate a circumferential coupling base;
   the circumferential coupling base having a circumferential inside periphery sized for sliding contact with designed tightness on a circumferential outside periphery of a pipe to which the pipe coupling is attachable;
   the circumferential coupling base being extended to a design position in relation to the seal end of the pipe coupling; and
   a flange extended a design distance outward radially from a design circumferential position proximate the seal end of the pipe coupling.

2. A compression sill-cock flange as described in claim 1 wherein:
   a design length of the circumferential coupling base is approximately equal to a distance from the circumferential sealing wall to the seal end of the pipe coupling.

3. A compression sill-cock flange as described in claim 1 wherein:
   a design length of the circumferential coupling base is a desired distance from the circumferential sealing wall in a direction of the seal end of the pipe coupling to maintain desired concentricity of axes of the circumferential coupling base and the pipe to which the pipe coupling is attachable.

4. A compression sill-cock flange as described in claim 1 and further comprising:
   a fitting funnel intermediate the seal end of the pipe coupling and the circumferential coupling base.

5. A compression sill-cock flange as described in claim 1 and further comprising:
   a double-tapered washer having a first end tapered reciprocally to a taper of the circumferential sealing wall and a second end tapered reciprocally to a taper of a sill-cock sealing wall.

6. A compression sill-cock flange as described in claim 5 and further comprising:
   a major diameter and a minor diameter of the double-tapered washer having respective lengths designed for desired separation of opposite-end tapers on the double-tapered washer.

7. A compression sill-cock flange as described in claim 1 and further comprising:
   an internally threaded set-screw orifice perpendicular to an axis of the pipe coupling and extended from an outside periphery to an inside periphery of the pipe coupling.

8. A compression sill-cock flange as described in claim 1 and further comprising:
   a set-screw boss positioned on an outside periphery of the pipe coupling; and
   an internally threaded set-screw orifice perpendicular to an axis of the pipe coupling and extended from an outside surface of the set-screw boss to a desired position on an inside periphery of the pipe coupling.

9. A compression sill-cock flange as described in claim 1 wherein:
   a seal side of the flange is perpendicular to the axis of the pipe coupling.

10. A compression sill-cock flange as described in claim 9 wherein:
    the seal side of the flange is flat.

11. A compression sill-cock flange as described in claim 9 and further comprising:
    at least one location notch in an outside periphery of the flange.

12. A compression sill-cock flange as described in claim 11 wherein:
    the at-least-one location notch in the outside periphery of the flange is sized and shaped to receive a desired retainer screw.

13. A compression sill-cock flange as described in claim 11 wherein:
    the at-least-one location notch in the outside periphery of the flange is sized and shaped to receive an insert to anchor the flange to an outside wall of a building under construction.

14. A compression sill-cock flange as described in claim 9 and further comprising:
    at least one location orifice parallel to the axis of the pipe coupling and positioned in the flange.

15. A compression sill-cock flange as described in claim 14 wherein:
    the at-least-one location orifice parallel to the axis of the pipe coupling and positioned in the flange is sized and shaped to receive mold material such as cement on an outside wall of a building under construction.

16. A compression sill-cock flange as described in claim 9 and further comprising:
    adhesive material positional on the seal side of the flange.

17. A compression sill-cock flange as described in claim 16 and further comprising:
    a detachable covering on the adhesive material.

18. A method for using a compression sill-cock flange having:
    a pipe coupling with straight internal machine threads having a constant inside diameter extended from proximate an attachment end of the pipe coupling to proximate a circumferential sealing wall on a circumferential inside periphery of the pipe coupling;
    the sealing wall being extended inward circumferentially and tapered conically in a direction towards a seal end of the pipe coupling from a major diameter of the sealing wall proximate a seal end of the straight internal machine threads to a minor diameter of the sealing wall proximate a circumferential coupling base;
    the circumferential coupling base having a circumferential inside periphery sized for sliding contact with designed tightness on a circumferential outside periphery of a pipe to which the pipe coupling is attachable;
    the circumferential coupling base being extended with a constant diameter to a design position in relation to the seal end of the pipe coupling; and
    a flange extended a design distance outward radially from a design circumferential position proximate the seal end of the pipe coupling;
    the method comprising the following steps:
        positioning the compression sill-cock flange as desired relative to final position of the compression sill-cock flange on a pipe extended from an exterior wall of a building under construction;
        finishing construction of the building to a design portion of completion relative to application of building substance and finishing work on the exterior wall of the building under construction;
        positioning a seal side of the flange in a desired position of contact with the exterior wall of the building under construction;
        marking the pipe to which the pipe coupling is attachable at a position designed to receive a double-tapered washer and to extend a select distance from the pipe coupling into a sill cock to be attached by means of the compression sill-cock flange to the pipe extended from an exterior wall of the building under construction;
        cutting the pipe to which the pipe coupling is attachable perpendicularly to an axis of the said pipe where marked;
        positioning the double-tapered washer on the said pipe intermediate a cut end of the said pipe and the circumferential sealing wall;
        positioning a sill cock with external threads on a sill-cock attachment pipe extended from the sill cock in threadable contact with the straight internal machine threads of the pipe coupling; and screwing the external threads of the sill-cock attachment pipe into the straight machine threads of the pipe coupling to a screwed position that tightens opposite ends of the double-tapered washer in sealing relationship to the circumferential sealing wall and a reciprocal circumferential sealing wall in the sill cock respectively.

19. A method as described in claim 18 and comprising the additional step of:

removing the double-tapered washer and the pipe coupling from the said pipe prior to cutting the said pipe; and continuing with the remaining steps.

20. A method as described in claim 18 and comprising the additional step of:

affixing the seal side of the flange as desired to the exterior wall of the building under construction.

21. A method as described in claim 18 and comprising the additional step of:

positioning a set screw in a set-screw orifice in the pipe coupling; and rotating the set screw to a position of desired tightness of the set screw against the said sill-cock attachment pipe after positioning the compression sill-cock flange as desired relative to a final positioning of the compression sill-cock flange on a pipe extended from a building wall.

* * * * *